US012698655B2

(12) United States Patent
Hubbard

(10) Patent No.: US 12,698,655 B2
(45) Date of Patent: Aug. 4, 2026

(54) DOOR LATCH WITH WORM GEAR

(71) Applicant: The Boeing Company, Arlington, VA (US)

(72) Inventor: Andrew J. Hubbard, Saint Charles, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/999,890

(22) Filed: Dec. 23, 2024

(65) Prior Publication Data

US 2026/0176897 A1      Jun. 25, 2026

(51) Int. Cl.
| | |
|---|---|
| *E05B 83/00* | (2014.01) |
| *B64C 1/14* | (2006.01) |
| *E05B 15/04* | (2006.01) |
| *E05B 55/00* | (2006.01) |

(52) U.S. Cl.
CPC ............ *E05B 83/00* (2013.01); *B64C 1/1407* (2013.01); *E05B 15/04* (2013.01); *E05B 55/00* (2013.01)

(58) Field of Classification Search
CPC ......... B64D 25/16; B64D 25/26; B64D 1/06; B64D 1/1415; B64D 1/14; B64D 1/1407; B64C 1/1415; B64C 1/14; B64C 1/1407; B64C 25/16
See application file for complete search history.

(56) References Cited

U.S. PATENT DOCUMENTS

| | | | | |
|---|---|---|---|---|
| 1,381,676 A | * | 6/1921 | Simpson | ............... E05F 11/382 |
| | | | | 49/374 |
| 1,646,181 A | * | 10/1927 | Babekuhl | ................ E05B 83/02 |
| | | | | 70/95 |
| 4,763,936 A | * | 8/1988 | Rogakos | ................. E05B 81/20 |
| | | | | 292/216 |
| 4,834,326 A | | 5/1989 | Stache | |
| 5,605,071 A | * | 2/1997 | Buchanan, Jr. | ........... F16H 1/16 |
| | | | | 188/134 |
| 5,823,473 A | * | 10/1998 | Odell | .................... B64C 1/1415 |
| | | | | 292/216 |
| 6,302,455 B1 | * | 10/2001 | Huang | ................ E05B 63/0013 |
| | | | | 292/201 |
| 7,959,195 B2 | * | 6/2011 | Harvey | ............... E05B 63/0069 |
| | | | | 292/DIG. 60 |
| 8,783,738 B2 | * | 7/2014 | Watanabe | ............... E05B 85/02 |
| | | | | 292/201 |

(Continued)

OTHER PUBLICATIONS

United States Patent and Trademark Office, "Non-Final Office Action," issued in U.S. Appl. No. 18/806,314, dated Jan. 13, 2026, 10 pages.

*Primary Examiner* — Arfan Y. Sinaki
(74) *Attorney, Agent, or Firm* — Hanley, Flight & Zimmerman, LLC

(57) ABSTRACT

Door latching systems, apparatus, articles of manufacture, and methods are disclosed. An example door latch includes a worm gear including a worm wheel and a worm screw, the worm wheel rotatable upon rotation of the worm screw; a lever operatively coupled to the worm wheel, the lever to rotate based on rotation of the worm wheel; a cam surface, the lever to contact the cam surface between a first rotational position and a second rotational position, the second rotational position different from the first rotational position; and a pin to enable rotation of the worm gear.

17 Claims, 10 Drawing Sheets

(56)        References Cited

U.S. PATENT DOCUMENTS

| | | | |
|---|---|---|---|
| 10,829,969 B2 * | 11/2020 | Rabois | E05C 19/12 |
| 11,060,566 B2 | 7/2021 | Meyer | |
| 11,280,124 B2 | 3/2022 | Hacault | |
| 12,397,905 B1 * | 8/2025 | Lyver | B64C 25/16 |
| 2005/0200137 A1 * | 9/2005 | Nelsen | E05B 81/64 |
| | | | 292/201 |
| 2026/0048830 A1 | 2/2026 | Hubbard | |

* cited by examiner

DOOR LATCH WITH WORM GEAR

FIELD OF THE DISCLOSURE

This disclosure relates generally to latches and, more particularly, to door latches and keys.

BACKGROUND

Door latches selectively secure doors so that the doors remain closed when not in use. For example, aircraft from small civilian aircraft to the largest commercial aircraft use many styles and designs of latches to secure doors or other hatches. Many latches for aircraft include handles or other actuation methods that fold to be flush with the aircraft mold line when closed. Door latches for outward facing aircraft doors help maintain a door seal and resist all working loads the door experiences during takeoff, flight, and landing.

SUMMARY

Door latching systems, apparatus, articles of manufacture, and methods are disclosed. An example door latch includes a worm gear including a worm wheel and a worm screw, the worm wheel rotatable upon rotation of the worm screw; a lever operatively coupled to the worm wheel, the lever to rotate based on rotation of the worm wheel; a cam surface, the lever to contact the cam surface between a first rotational position and a second rotational position, the second rotational position different from the first rotational position; and a pin to selectively enable rotation of the worm wheel.

An example aircraft includes a door covering a chamber of the aircraft, the door rotatably coupled to the aircraft about a first axis of rotation, the door to rotate between an open position and a closed position, the door including a seal around a perimeter of the door, the seal to deform when the door is in the closed position; a latch coupled to the door in the chamber, the latch to selectively prevent rotation of the door, the latch including: a lever having a second axis of rotation different than the first axis of rotation; a worm gear including a worm wheel and a worm screw, the worm wheel rotatable in response to rotation of the worm screw, the lever rotatable in response to rotation of the worm wheel; a pin to selectively enable rotation of the worm wheel; and a cam to contact the lever to prevent the door from moving towards the open position; and a hole in a skin of the aircraft, the hole to receive a tool to move the pin and rotate the worm screw.

An example method of securing a hatch door of an aircraft includes moving the hatch door to a closed position; inserting a key into a hole in the hatch door, the hole aligned with a latch that is movable between a locked position and an unlocked position, the latch including: a housing having a first aperture, a gear rotatable in the housing, the gear including a second aperture, a locking pin movable in the first aperture and the second aperture, and a key pin movable in the second aperture, the key to move the key pin in the second aperture, which moves the lock pin from the second aperture and in the first aperture to enable rotation of the gear; rotating the key to transfer torque from the key to the gear, which moves the latch to the locked position; and removing the key when the latch is in the locked position.

BRIEF DESCRIPTION OF THE DRAWINGS

In general, the same reference numbers will be used throughout the drawing(s) and accompanying written description to refer to the same or like parts. The figures are not necessarily to scale.

DESCRIPTION

Door latches are used to secure doors in a closed state. Door latches for external aircraft doors are designed to balance strength requirements, aerodynamic requirements, and ease of actuation. Some conventional door latches fold flush with the outer surface of the aircraft but leave discontinuities such as holes, gaps, or lines in the aircraft outer mold line.

Door latching apparatus and methods disclosed herein use a small hole in the outer mold line of the fuselage as a tool or key access point. A key drives a worm gear to turn a system of levers to pull against cams to close and secure a door shut. The worm gear allows the levers to be manually actuated to secure and release the door. The worm gear acts as a gear-reducer and 90° gearbox to reduce required input torques, thus allowing for a smaller interface tool and a correspondingly smaller discontinuity on the aerodynamic surface. The worm gear additionally resists back-driving loads during use.

Door latching apparatus and methods disclosed herein include a lever and a cam surface. The lever and the cam surface allow the latch to provide a securing load over a range of travel. Additionally, the cam surface provides an over-center function to generate a contact force that urges the lever towards the fully closed position. Similar to a cam latch, the lever generates greater clamping forces as the lever rotates against the cam surface until it reaches a stable over-center position. The cam surface can be shaped to tune desired closure mechanics that define door motion and mechanical advantage.

Figure 1:
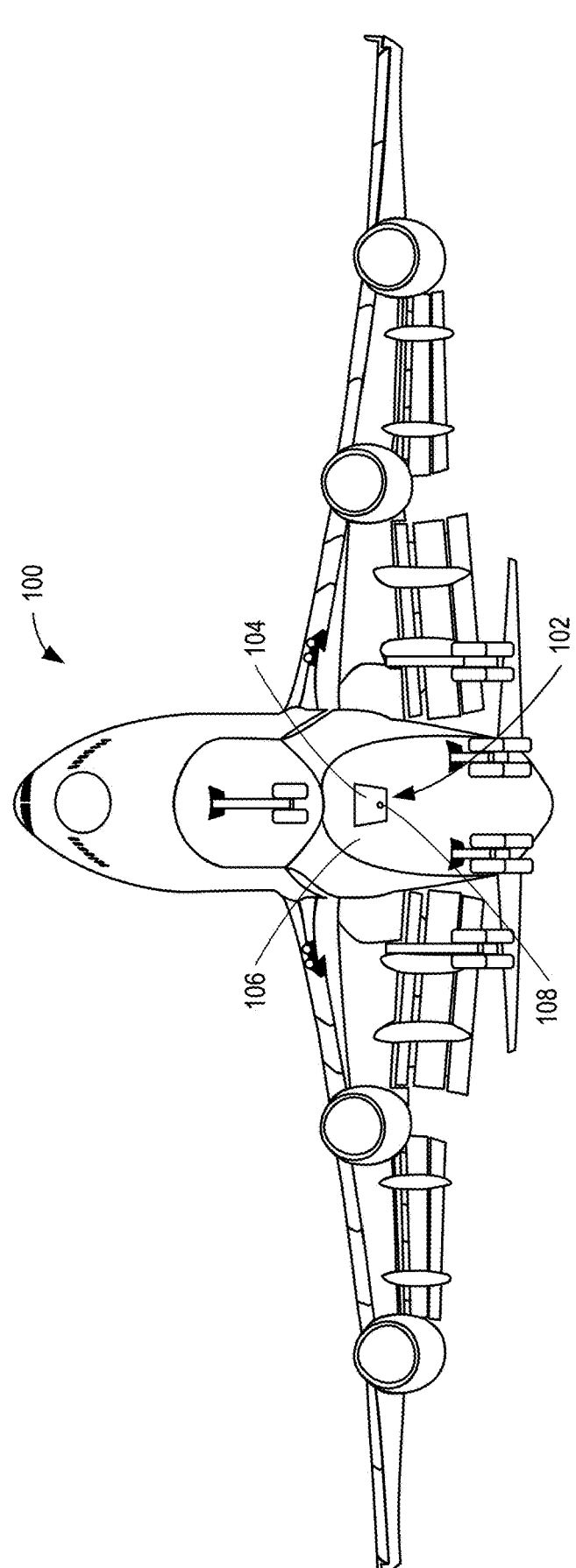
FIG. 1 is an example aircraft on which an example latch secures an example door.

FIG. 1 is an example aircraft 100 on which an example latch 102 can secure an example door 104. The door 104 is an access door (e.g., a hatch) moveably coupled to the aircraft 100 between an open position and a closed position. In some examples, the door 104 is coupled to the aircraft 100 with a hinge. The door 104 opens to access a compartment inside of the aircraft 100 (e.g., an interior space, a chamber, an inner cavity, etc.). The outer surface of the door 104 is shaped (e.g., contoured) to follow an outer mold line (e.g., aerodynamic shape) of the aircraft 100 when in the closed position. In some examples, the door 104 has a planar exterior surface. In other examples, the door 104 can have a curved or irregular exterior surface. The door 104 is shown positioned on a lower portion of a fuselage 106 of the aircraft 100. However, in other examples, the door 104 can be located on a different part of the aircraft 100 (e.g., a wing, a pylon, etc.). The latch 102 is accessed by an example opening 108 on the door 104 (further detailed below). The opening 108 (e.g., a tool interface, a tool hole, a keyhole etc.) allows a key to enter the door 104 and open the latch 102. In some examples, the opening 108 is located on the aircraft 100 near an edge of the door 104.

Figures 2A, 2B:
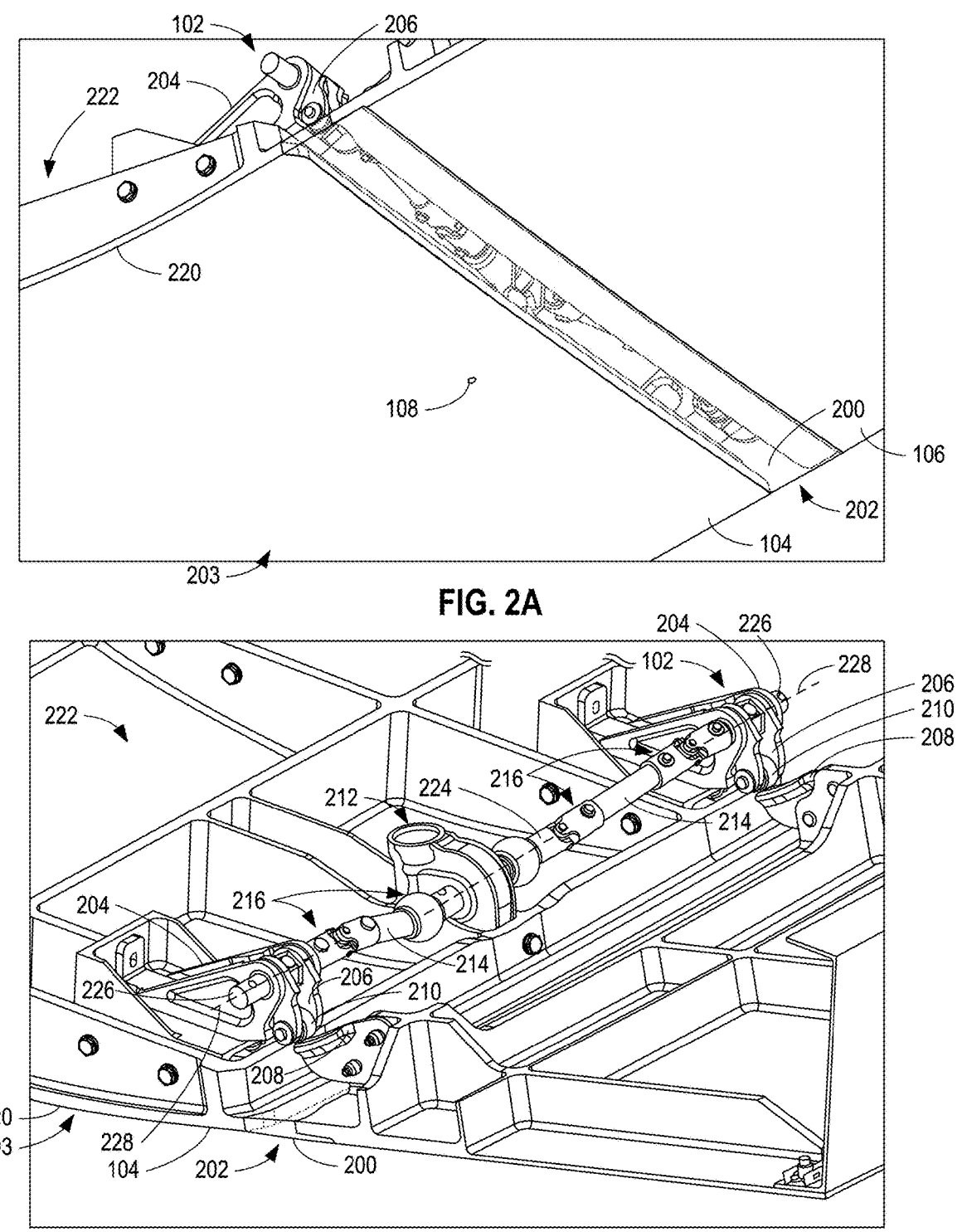
FIG. 2A illustrates an exterior view of the example latch securing the door of FIG. 1.
FIG. 2B illustrates an interior view of the example latch securing the door of FIG. 1.

FIGS. 2A and 2B illustrate the example latch 102 securing the door 104 of FIG. 1. For clarity, portions of the door 104 and the fuselage 106 have been removed. FIG. 2A shows the door 104 in the closed position. An example seal 200 is shown transparent to illustrate an example gap 202 between the door 104 and the fuselage 106. The seal 200 is coupled to an external side 203 (FIG. 2B) of the door 104 and extends from the door 104 to overlap the fuselage 106. In this way, the seal 200 covers the gap 202 when the door 104 is in the closed position. The seal 200 deforms to seal the gap 202 when the door 104 is in the closed position. For clarity, only a portion of the seal 200 is shown.

The latch 102 of FIG. 2B includes example brackets 204 rotatably coupled to corresponding example levers 206 to support the levers 206. The levers 206 (e.g., cranks) contact example cam surfaces 208 to close and secure the door 104. In other words, the levers 206 selectively couple to the cam surfaces 208 to prevent the door 104 from moving towards the open position. In some examples, the brackets 204 can be adjusted (e.g., shimmed, moved, etc.) to change an alignment of the levers 206 and the cam surfaces 208 or to change a final position of the door 104 (e.g., a total amount of deformation of the seal 200) when the door 104 is in the closed position. In some examples, the levers 206 include example rollers 210 to reduce friction between the levers 206 and the cam surfaces 208. The latch 102 is actuated by an example worm gear 212 (e.g., a worm drive), disclosed in more detail below. The worm gear 212 is operatively coupled to the levers 206 to cause the levers 206 to rotate based on rotation of the worm gear 212. In some examples, the worm gear 212 is operatively coupled to the levers 206 via example torque tubes 214 (e.g., tubes, rods, members, etc.). In some examples, the torque tubes 214 include example universal joints 216 to compensate for any misalignment with the brackets 204 and/or the worm gear 212. In some examples, the brackets 204, the levers 206, the worm gear 212 are fixed or otherwise positioned on structure of the aircraft 100, and the cam surface 208 are on the rotatably coupled door 104).

The door 104 of FIG. 2A includes the example opening 108 proximate the worm gear 212 to receive a tool or key. The opening 108 aligns with the worm gear 212 so that the key can enter the opening 108 from the external side 203 of the door 104 and engage the worm gear 212. In this way, the worm gear 212 and, more broadly, the latch 102 is actuated by the key. In some examples, the key is a manual tool (e.g., a hexagonal key, a screwdriver, a socket wrench, etc.) that can extend through the opening 108 and engage with the worm gear 212. In other examples, the key can be an automated tool (e.g., an electric screwdriver) with an attachment to an interface with the worm gear 212.

The seal 200 surrounds the door 104 (e.g., a perimeter of the door 104) and covers the gap 202 that surrounds the door 104. In some examples, the seal 200 is shaped to slope inward (e.g., towards the fuselage 106) from an example outer mold line 220 of the door 104 when the door 104 is in the open position. As the door 104 moves to the closed position, the seal 200 elastically deforms (e.g., bends, flexes, compresses, etc.) to match the outer mold line 220. The seal 200 contacts the fuselage 106 and exerts pressure on the fuselage 106 that increases relative to a total deformation of the seal 200. The pressure generated by the deformed seal 200 seals the door 104 to the fuselage 106 to prevent fluids from moving through the gap 202. In some examples, the seal 200 deforms to mate with the outer mold line 220 of the fuselage 106 and to close any gaps or discontinuities between the seal 200 and the fuselage 106. In some examples, the seal 200 includes an elastomeric material. The seal 200 of FIGS. 2A and 2B is shown as a flange. In other examples, the seal 200 can have a different shape or location relative to the door 104 and the fuselage 106. In some examples, the door 104 includes a flange and the seal 200 is compressed between the door 104 and the fuselage 106.

The latch 102 of FIGS. 2A and 2B is coupled to an internal side 222 of the door 104. In some examples, the worm gear 212 is coupled to the door 104 and coupled to the torque tubes 214 to rotate the torque tubes 214. In some examples, the torque tubes 214 couple to the worm gear 212 at an example axis of rotation 224 of the worm gear 212 and extend away from the worm gear 212. The torque tubes 214 are shown as cylinders extending from the worm gear 212. In other examples, the torque tubes 214 can have a different shape to transfer a torque required to actuate the latch 102. In some examples the torque tubes 214 are hollow tubes to reduce a weight of the torque tubes 214. The torque tubes 214 of FIG. 2B are shown with an example size (e.g., a diameter) and an example length to couple to the levers 206. In other examples, the torque tubes 214 can have a different size and a different length. The levers 206 are shown at an example distance from the worm gear 212. In other examples, the levers 206 can have a different position and/or orientation relative to the worm gear 212. In some examples, the levers 206 are evenly spaced from the worm gear 212. In other examples, the levers 206 are asymmetrically positioned relative to the worm gear 212. In some examples, the universal joints 216 couple the torque tubes 214 to the worm gear 212 and/or the levers 206 to compensate for any misalignment between the worm gear 212 and the levers 206.

The levers 206 of the latch 102 of FIG. 2B are coupled to the internal side of the 222 of the door 104 (e.g., within an inner cavity, within a chamber, within a compartment etc.). In some examples the levers 206 rotate within planes approximately orthogonal to the outer mold line 220 (e.g., a skin of the aircraft 100, the fuselage 106, etc.). In some examples, the levers 206 include two parallel portions to support the rollers 210. In other examples, the levers 206 can have different shapes (e.g., solid beam, flanged, etc.). The brackets 204 support the levers 206 and allow the levers 206 to rotate. In some examples, the brackets 204 are coupled to the door 104 and transfer reaction forces from the levers 206 to the door 104. In some examples, the brackets 204 include bearings (e.g., ball bearings) to support the reaction forces from the levers 206 while allowing the levers 206 to rotate freely. In some examples, the levers 206 are coupled to example shafts 226 that are rotatably coupled to the brackets 204. In some examples, the brackets 204 include two parallel portions to support the levers 206 and define example axes of rotation 228 of the levers 206. In other examples, the brackets 204 can have different shapes. The latch 102 of FIG. 2B includes two brackets 204 and two levers 206. In other examples, the latch 102 can include any number of brackets 204 and levers 206 (e.g., one bracket 204 and lever 206, three brackets 204 and levers 206, four brackets 204 and levers 206, etc.), the levers 206 coupled to the worm gear 212 via corresponding ones of the torque tubes 214. In this way, the worm gear 212 can actuate any number of levers 206 along the door 104 that contact a corresponding number of the cam surfaces 208 at approximately a same time.

The cam surfaces 208 (e.g., cams, cam brackets, etc.) of FIG. 2B are coupled to the fuselage 106 and/or an underlying structure of the aircraft 100. As described in more detail below, the cam surfaces 208 contact the levers 206 (e.g., the rollers 210 of the levers 206) as the levers 206 rotate. In this way, the levers 206 are compressed between the cam surfaces 208 and the brackets 204, causing the seal 200 to deform and the door 104 to move into a fully closed position. In some examples, the cam surfaces 208 are wider than the levers 206 (e.g., the rollers 210 of the levers 206) to accommodate for any misalignment between the levers 206 and the cam surfaces 208. In some examples, the cam surfaces 208 are coupled to the door 104 and the latch 102, including the brackets 204, the levers 206, and the worm gear 212, is coupled to the fuselage 106.

Figure 3A:
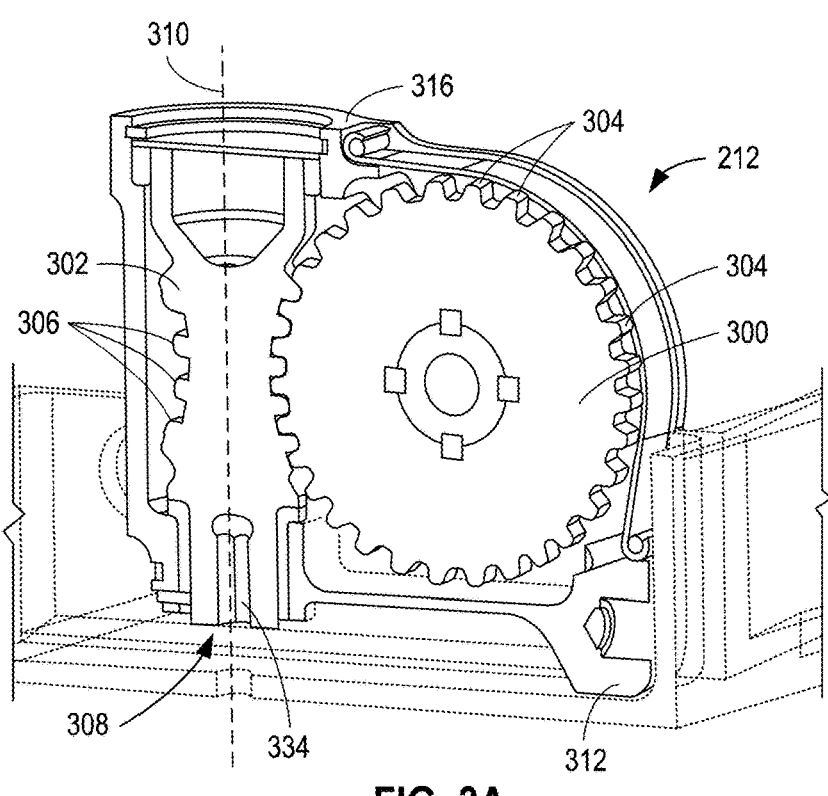
FIG. 3A is a side cross-sectional view of an example worm gear of the latch of FIG. 2B.
Figure 3B:
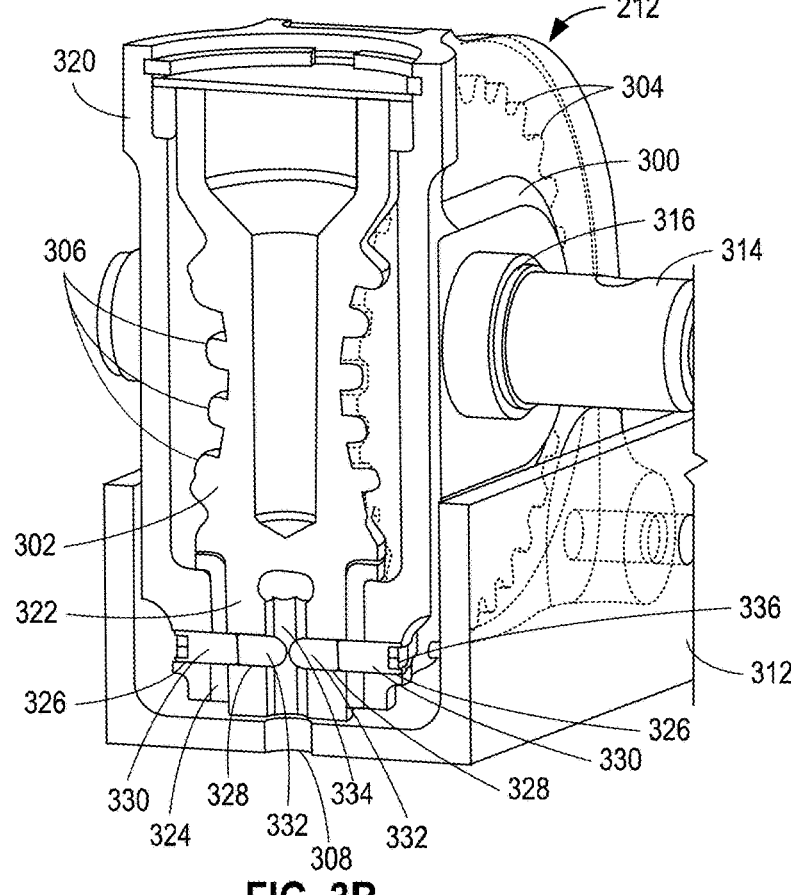
FIG. 3B is a front cross-sectional view of the worm gear.

FIGS. 3A and 3B are front and side cross-sections of the example worm gear 212 of FIG. 2B. The worm gear 212 (e.g., worm drive) includes an example gear or worm wheel 300 and an example worm screw 302. The worm wheel 300 includes example gear teeth 304. Similarly, the worm screw 302 includes example threads 306. The gear teeth 304 are sized and pitched to mesh with the threads 306. The worm screw 302 receives an input torque via an example recess 308 (e.g., tool interface, hex socket, cruciform drive, keyhole, etc.). The worm screw 302 rotates about an example axis of rotation 310 in response to the input torque. The worm wheel 300 interfaces with the worm screw 302 such that rotation of the worm screw 302 about the axis of rotation 310 causes the worm wheel 300 to rotate about the axis of rotation 224. In the illustrated example, the worm gear 212 is a double enveloping worm gear.

An example bracket 312 couples to the worm wheel 300 and the worm screw 302 to prevent the worm wheel 300 and the worm screw 302 from translating relative to the bracket 312. In some examples, the bracket 312 couples to the door 104 (FIG. 2A) and supports loads received by the worm wheel 300 and the worm screw 302. In some examples, the worm wheel 300 couples to the levers 206, the torque tubes 214, and/or the universal joints 216 via an example gear shaft 314. The gear shaft 314 is rotatably coupled to the bracket 312 to allow the gear shaft 314 to rotate about the axis of rotation 224. In some examples, the gear shaft 314 is supported by example bearings 316 located on opposite sides of the worm wheel 300. The bracket 312, the worm wheel 300, and the worm screw 302 of FIGS. 3A and 3B are shown in an example orientation. In other examples, the bracket 312, the worm wheel 300, and the worm screw 302 can have different orientations resulting in differently oriented axes of rotation 224.

The worm gear 212 of FIGS. 3A and 3B provides a mechanical advantage in actuating the latch 102. The worm screw 302 rotates to apply a force to the worm wheel 300, resulting in the worm wheel 300 rotating. The input torque received by the worm screw 302 is multiplied by an example gear ratio between the worm wheel 300 and the worm screw 302 to generate an output torque generated by the worm wheel 300. In this way, the input torque required to actuate the latch 102 and fully close (e.g., seal) the door 104 can be reduced. Reducing the required input torque allows use of a smaller tool and, relatedly, a smaller opening 108 (FIG. 2A). In some examples, the opening 108 may have a diameter of about 0.192 inches (approximately 4.88 millimeters). Thus, the worm gear 212 allows the size of the opening 108 to be reduced and the corresponding interruption (e.g., surface discontinuity) in the aerodynamic surface of the aircraft 100 to be reduced. Additionally, the gear ratio of worm gear 212 and friction in the back-driving direction prevents loosening of the latch 102. Thus, the user only experiences resistive loads when opening or closing the door 104.

The worm gear 212 includes an example housing 320. The worm wheel 300 and the worm screw 302 are selectively rotatable in the housing 320. A portion of the worm screw 302 includes an example screw shaft 322 that extends, in the illustrated example, to a lower portion the housing 320. In some examples, the screw shaft 322 is surrounded by an example bushing 324. The housing 320 includes an example first aperture 326 (which also, in this example, extends through the bushing 324). The screw shaft 322 includes an example second aperture 328. The worm gear 212 of the latch 102 also includes an example locking pin 330 and an example key pin 332. Collectively, the locking pin 330 and key pin 332 may be referred to as a pin. In the illustrated example there is a duplicative first aperture 326, second aperture 328, locking pin 330, and key pin 332 on the opposite side of the housing 320 and screw shaft 322. In other examples, there may be only one set of these components or there may be more (e.g., three, four, etc.).

FIG. 3B shows the worm gear 212 in the locked position. In the locked position, the locking pins 330 extend from the first apertures 326 and at least partially into the second apertures 328. In this position, the locking pins 330 prevent rotation of the worm screw 302. When the worm screw 302 is rotationally fixed, the worm wheel 300 cannot rotate, which prevents movement of the latch 102 and, therefore, movement of the door 104. The worm screw 302 includes an example interface or key cavity 334 that is aligned with the keyhole 308. The second apertures 328 open into the key cavity 334. In the locked position of FIG. 3B, the key pins 332 extend into the key cavity 334. The worm gear 212 includes an example spring 336 that biases the locking pins 330 and the key pins 332 to the locked position. In this illustrated example, the spring 336 includes one or more flexible retaining rings that serve as coil springs. In some examples, the spring 336 may be composed of steel. In some examples, the spring 336 is adjacent or at least partially in the first aperture 326.

Figure 4:
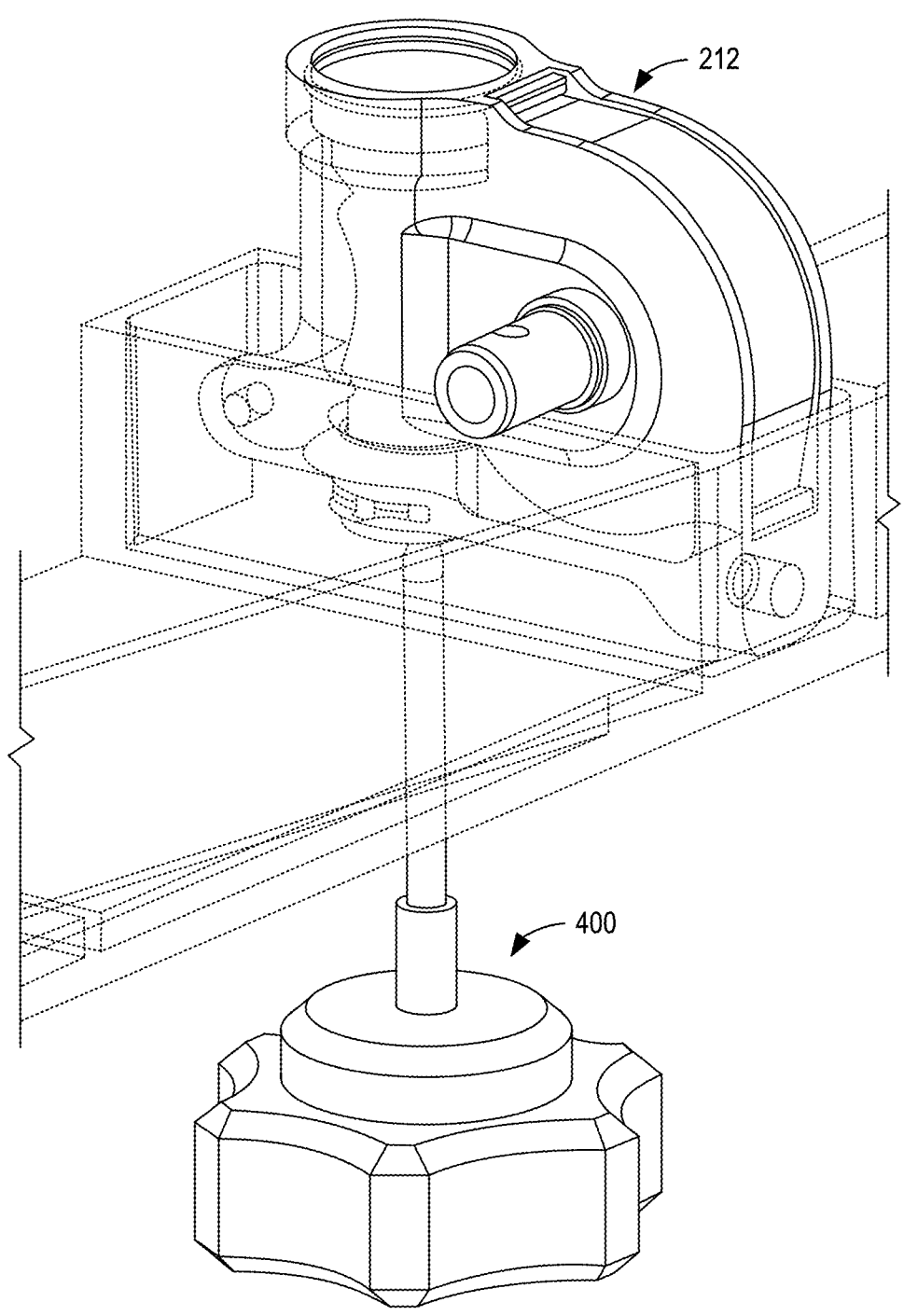
FIG. 4 illustrates an example key engaged with the latch of FIG. 2B.
Figure 5A:
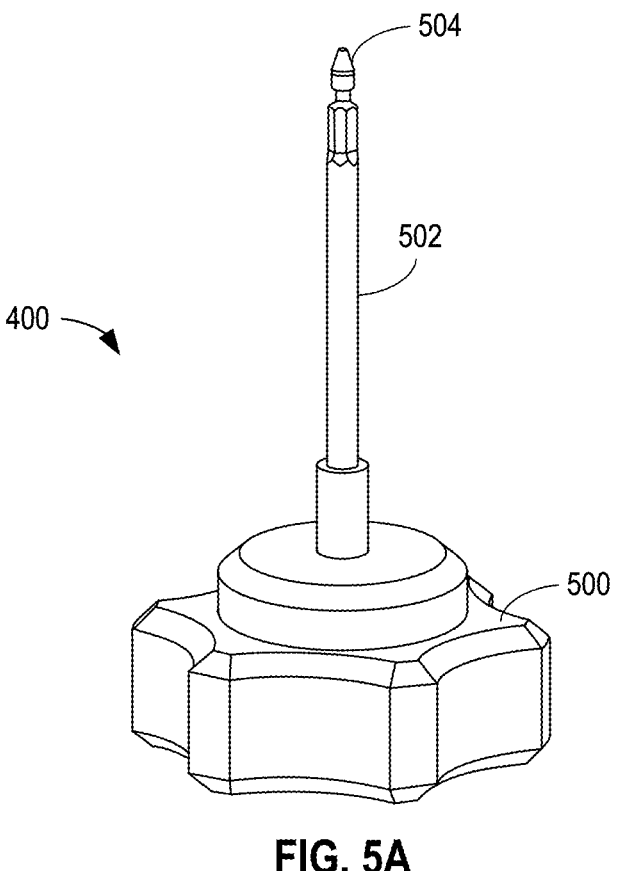
FIG. 5A is an isolated view of the key of FIG. 4.

A tool such as an example key 400, as shown in FIG. 4, can be inserted into the key cavity 334 to displace the key pins 332 and unlock the worm gear 212. FIG. 5A is an isolated view of the key 400. The key includes an example grip or handle 500, an example elongated shaft 502, and an example drive pin 504. The grip 500 is rotated, which translates the rotation to the worm screw 302. In some examples, the grip 500 is a torque-limiting knob that provides haptic feedback and/or audio feedback when the latch 102 is fully closed.

Figure 5B:
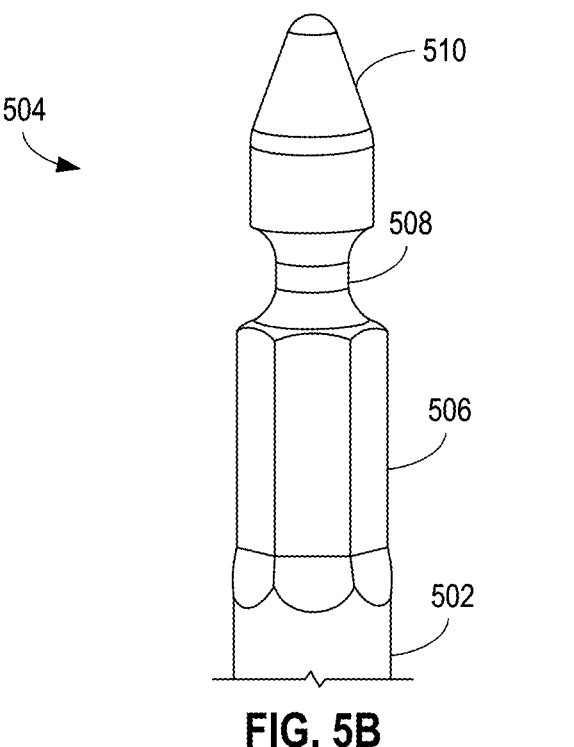
FIG. 5B is an enlarged view of a drive pin of the key of FIG. 4.

FIG. 5B is an enlarged view of the drive pin 504. The drive pin 504 includes a profiled section 506. In the illustrated example, the profiled section 506 is a hex shank. In other examples, other profiles may be used. The profiled section 506 also includes an example retention groove 508 and an example rounded tip 510.

Figure 6A:
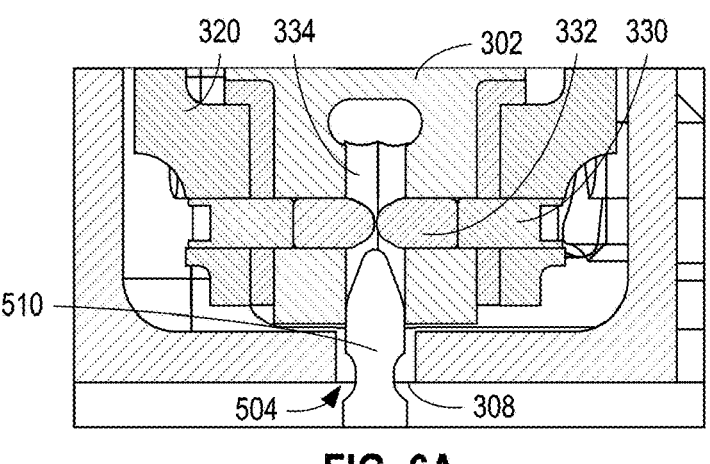
FIGS. 6A-6D illustrate the drive pin of the key engaged with the latch in different positions.

FIGS. 6A-6D illustrate the drive pin 504 of the key 400 engaged with the gear worm 212 of the latch 102 in different positions. In FIG. 6A, the drive tip 510 of the drive pin 504 is inserted into the hole 308 and into the cavity 334 of the worm screw 302. The rounded contour of the tip 510 engages the key pins 332 that are extended into the cavity 334.

Figure 6B:
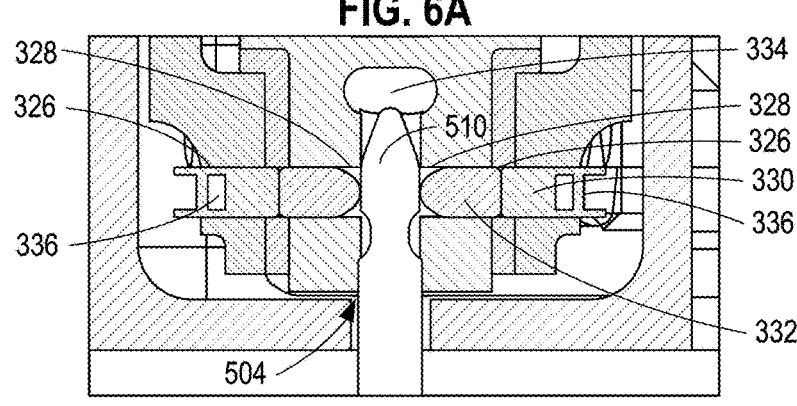

In FIG. 6B, the drive pin 510 has displaced the key pins 332 and moved or retracted the keys pins 332 laterally within the second apertures 328. In this position, a portion of the key pins 332 are in the first apertures 326. The movement of the key pins 332, which are aligned with the locking pins 330, laterally displaces the locking pins 330. In this example, the locking pins 330 are moved within the first apertures 326 and are moved out of the second apertures 328. The drive pin 504 moves the locking pins 330 and the key pins 332 against the force of the spring 336.

Figure 6C:
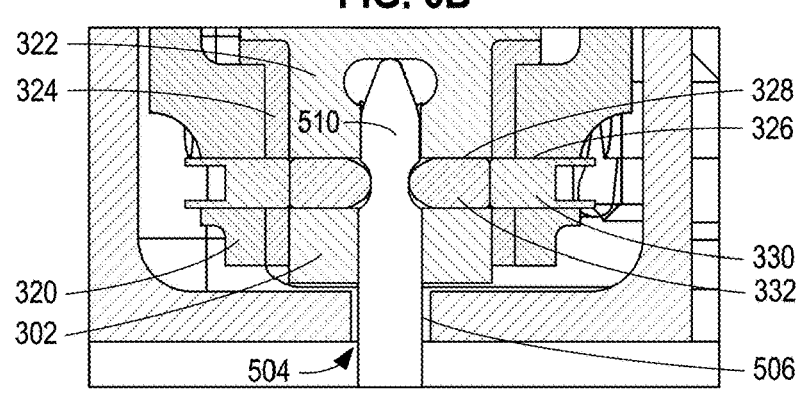

In FIG. 6C, the drive pin 504 has extended further in the cavity 334. The key pins 332 extend or move back in the direction toward the cavity 334. The key pins 332 engage the retention groove 508. In this position, the key pins 332 are not disposed within the first apertures 326, and the locking 330 are not disposed in the second apertures 328. The interface of the key pins 332 and the locking pins 330 aligns with the interface of the first apertures 326 and the second apertures 328. These interfaces also align, in FIG. 6C, with a shear plane or shear line defined at the cylindrical surface or interface between the screw shaft 322 and the bushing 324. The overlap or alignment of the key pins 332 and the locking pins 330 with the shear plane define the rotational freedom of the gear 212. Thus, the worm screw 302 is free to rotate within the housing 320. In this example the pins (e.g., the locking pins 330 and the key pins 332) selectively enable rotation of the worm screw 302, rotation of the worm wheel 300, and operating of the gear 212 and the latch 102.

The cavity 334 has a surface that complements the profiled section 506 such that movement (i.e., rotation) of the tool 400 and thus the profiled section 506 causes rotation of the worm screw 302 when the locking pins 330 have been removed from the second aperture 328. Rotating the key 400 transfers torque from the key 400 to the worm gear 212, which moves the latch 102 to between the locked position and the unlocked position.

Figure 6D:
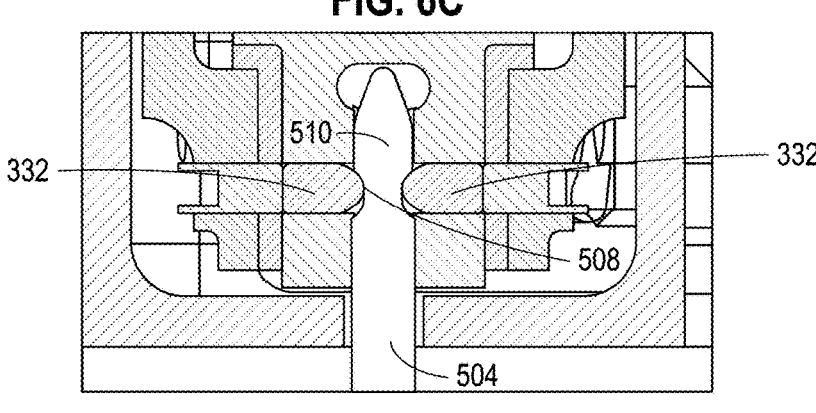

As shown in FIG. 6D, the retention groove 508 hold the tool 400 in the latch unless a force is imparted to pull the tool 400 against the force of the spring 336 when the locking pins 330 and keys pins 332 are aligned. When the locking pins 330 and the key pins 332 are not aligned (e.g., the locking pins 330 and the key pins 332 are radially displaced), the tool 400 is not removable from the cavity 334. When the tool 400 is not removed, the tool 400 dangles or otherwise extends from the door 104. The tool 400, in this situation, provides a visual indication that the door 104 may not be closed and/or latched.

Figure 7A:
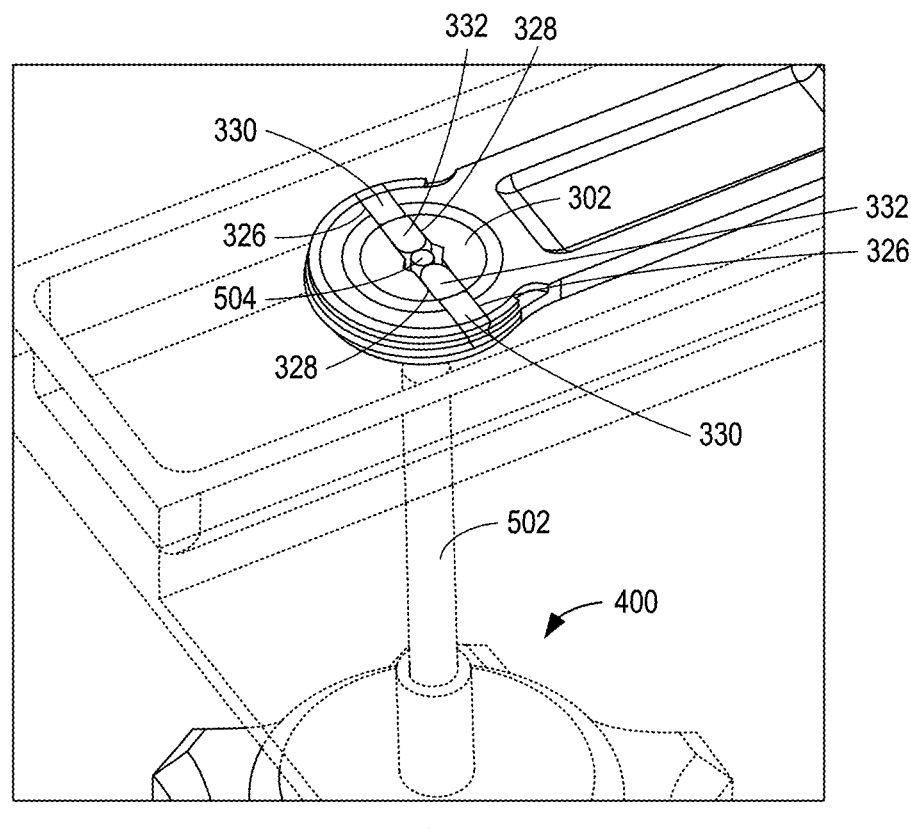
FIG. 7A is a cross-sectional view of the latch in an unlocked position.
Figure 7B:
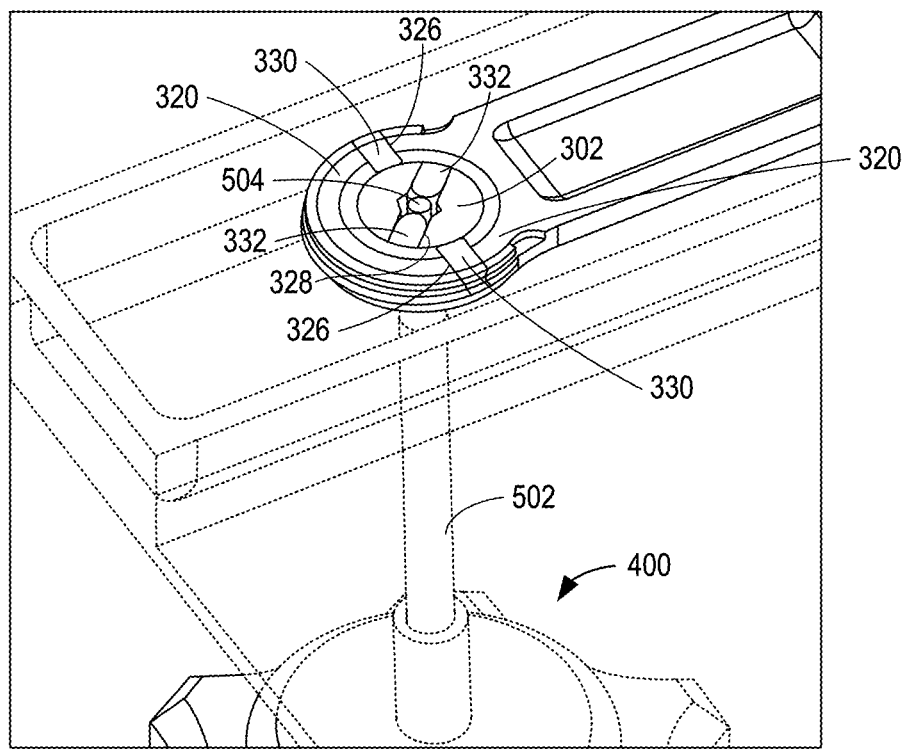
FIG. 7B is a cross-sectional view of the latch in a semi-locked position.

FIG. 7A is a cross-sectional view of the latch 102 in an unlocked position. FIG. 7B is a cross-sectional view of the latch 102 in a semi-locked (i.e., intermediate) position. The tool 400 is inserted into the cavity 334 of the worm screw 302. Initially, the key pins 332 and the locking pins 330 align, as shown in FIG. 7A. Similarly, the first apertures 326 and the second apertures 328 also align. As the key 400 is rotated, the worm screw 302 is rotated in the housing 320. The key pins 332 and the locking pins 330 become radially displaced, as shown in FIG. 7B. Similarly, the first apertures 326 and the second apertures 328 also are radially displaced. In the between position of FIG. 7B, the axes of the locking pins 330 and the key pins 332 are not aligned, and the tool 440 cannot be removed.

The first apertures 326 are located 180 degrees apart in the housing 320. In other words, the first apertures 326 are positioned across each other on opposite sides of the worm screw 302. Every half rotation of the tool 400 causes the second apertures 328 to align with the first apertures 326. The tool 400 is removable when the second apertures 328 align with the first apertures 326 (or every half rotation of the tool 400). There are 4.5 rotations, in this example, for the door 104 to be fully closed and the latch 102 fully secured. Thus, the fully closed position appears the same as the unlocked position in FIG. 7A. The operator can clearly see that the door 104 is not closed if the tool 400 is removed during one of the half turns before the full 4.5 turns of the tool 400 have occurred. In such an example, there would be a gap in the seal of the door 104 relative to the fuselage 106. To further ensure that the full 4.5 turns of the tool have occurred, the cap 500 of the tool includes torque limiting features that provide haptic feedback and/or audio feedback (e.g., clicks) indicating that full rotation of the tool 400 has occurred. The haptic feedback and/or audio feedback is readily observable or discernible by the operator. The torque limiting features also prevent the operator from over rotating the tool 400 and providing excessive torque to the worm screw 302. The torque limiting features prevent damage to the latch 102 and/or the door 104.

FIGS. 8A-8D illustrate the example lever 206 and the example cam surface 208 of FIG. 2B as the lever 206 rotates to close the example door 104. The lever 206 of FIG. 4A is rotated to an example first rotational position 800 of initial contact. The first rotational position 800 represents a near closed position of the door 104, where the seal 200 is not deformed. The lever 206 prevents the door 104 from moving towards the open position when in the first rotational position 800. From the first rotational position 800, the lever 206 can rotate away from the cam surface 208 (e.g., counterclockwise) or towards the cam surface 208 (e.g., clockwise). If and/or when the lever 206 moves away from the cam surface 208 from the first rotational position 800, the lever 206 no longer contacts the cam surface 208, and the door 104 is allowed to move towards the open position. In some examples, the door 104 rotates via an example hinge 802 to move from the open position to the closed position. Once near the closed position, the door 104 is secured by rotating the lever 206 towards the cam surface 208. In some examples, the axis of rotation 228 of the lever 206 is parallel to an example axis of rotation 806 of the hinge 402. In this way, the lever 206 aligns with the cam surface 208 as the door 104 rotates about the axis of rotation 406.

Figure 8A:
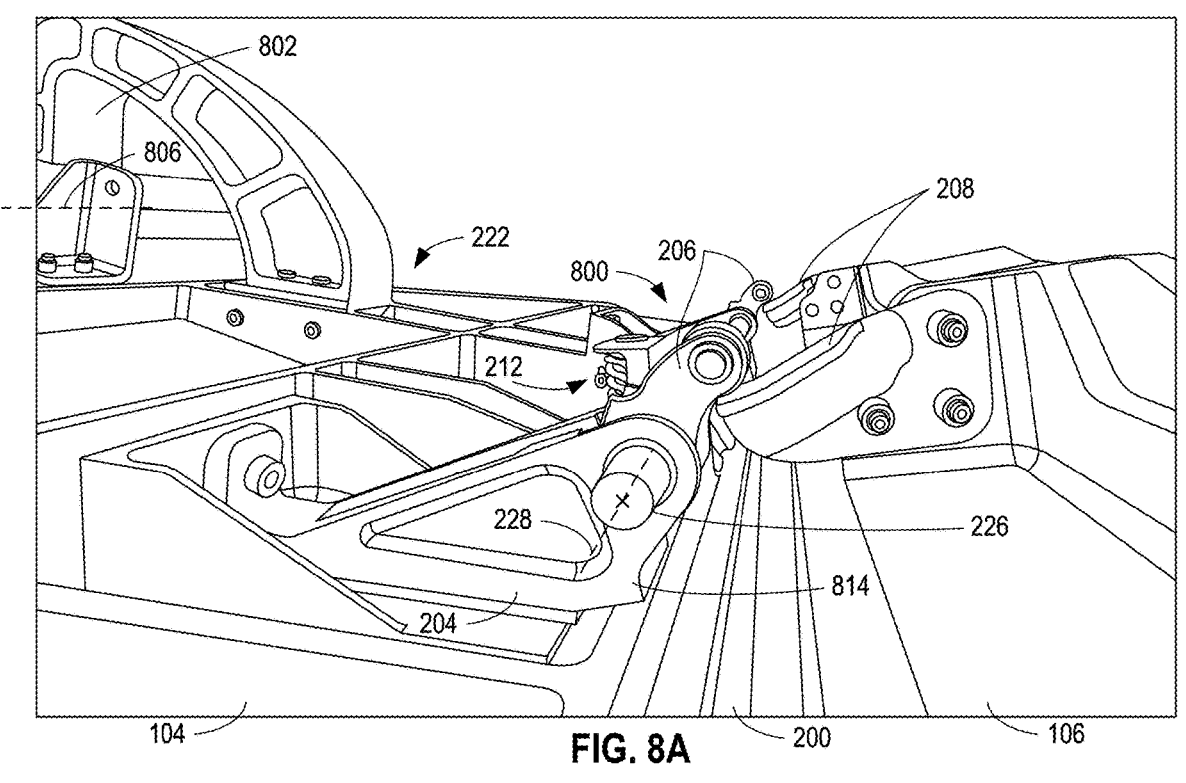
FIGS. 8A-8D illustrate an example lever and an example cam surface of FIG. 2B as the lever rotates to close the door.
Figure 8B:
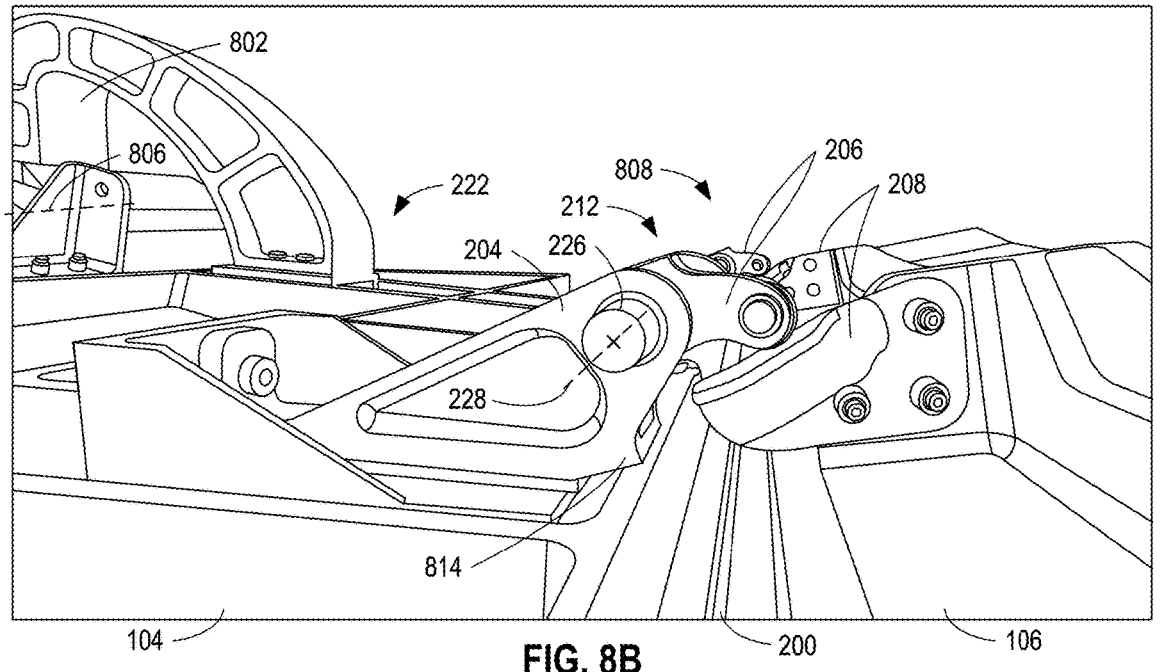
Figure 8C:
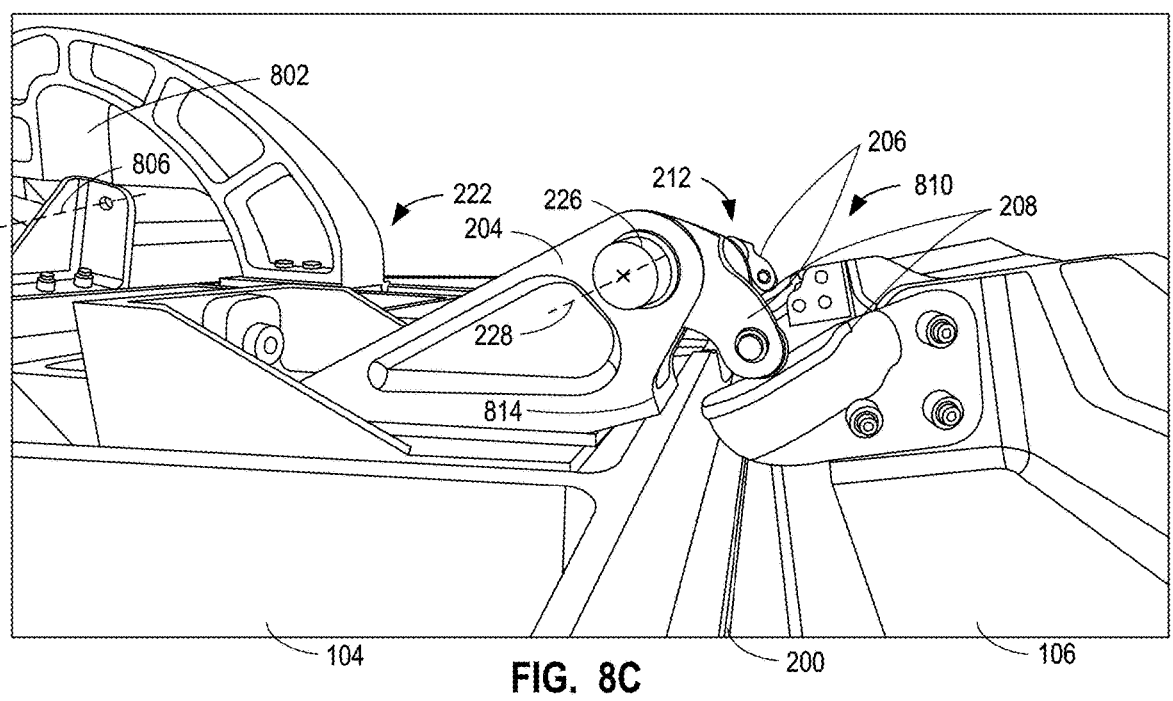
Figure 8D:
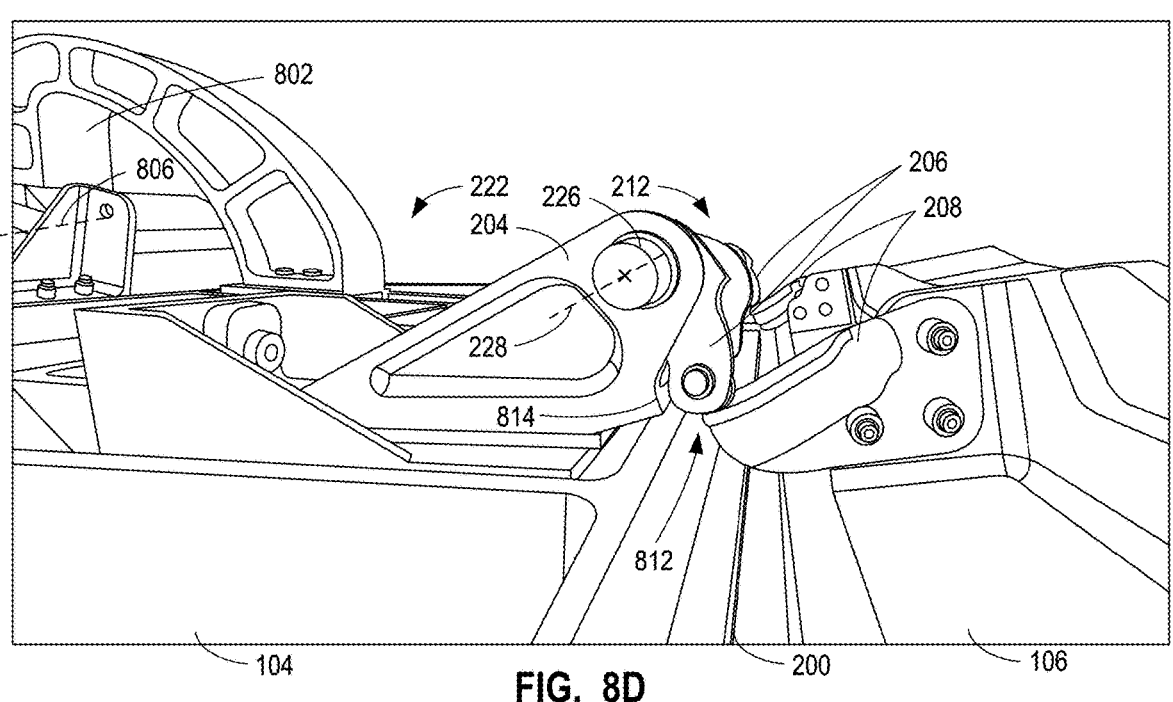

FIG. 8B shows the lever 206 in an example second rotational position 808 of increasing load. When the lever 206 rotates from the first rotational position 800 towards the second rotational position 808, the door 104 moves closer to the closed position and the seal 200 begins to deform. The loads transferred to the lever 206 are relatively small and include a torque component. FIG. 8C shows the lever 206 as the lever 206 continues to rotate towards the cam surface 208 to an example third rotational position 810. In the third rotational position 810, the door 104 is near the closed position and the seal 200 is nearly fully deformed. As such, the seal 200 exerts a strong force (e.g., 400 pounds) on the fuselage 106 that biases the door 104 to move towards the open position. In the third rotational position 810, the loads transferred to the lever 206 include mainly compressive forces as the contact angle approaches on-center alignment. As discussed in further detail below in reference to FIG. 9, on-center alignment refers to the contact forces between the lever 206 and the cam surface 208 aligning with or directed toward the axis of rotation 228. FIG. 8D shows the lever 206 as the lever 206 completes its rotation and ends in an example fourth rotational position 812. In some examples, the lever 206 contacts an example stop 814 of the bracket 204 when the lever 206 is in the fourth rotational position 812. The stop 814 provides feedback (e.g., a jump in resistance to the input torque) to signal that the lever 206 has completed rotating and the latch 102 is fully actuated (e.g., locked, latched, secured, etc.).

The cam surfaces 208 are shaped (e.g., include a profiled surface) to interact with the lever 206 during closing and latching the door 104. The point of contact between the lever 206 and the cam surface 208 defines a direction of the reaction force (e.g., a normal force, a contact force, etc.) between the cam surface 208 and the lever 206. The direction of the reaction force relative to the axis of rotation 228 determines how much torque and how much compression the lever 206 receives. Thus, the cam surface 208 can be designed to change the direction of the reaction force as the lever 206 rotates between rotational positions 800, 808, 810, 812. In some examples, the cam surface 208 is profiled to provide a constant, or near constant, torque profile (e.g., the input torque provided to the worm gear 212 to move the lever 206 between the first rotational position 800 and the fourth rotational position 812). For example, the reaction forces generated in the first rotational position 800 and the second rotational position 808 are directed away from the axis of rotation 228, which increases a torque acting on the lever 206. Thus, the input torque required to rotate the lever 206 when the seal 200 is generating relatively low loads is increased as a larger portion of the reaction force generates torque. The reaction forces generated in the third rotational position 810 and the fourth rotational position 812 are directed towards the axis of rotation 228 to decrease the torque acting on the lever 206. Thus, the input torque required to rotate the lever 206 when the seal 200 is generating relatively high loads (e.g., due to increased deformation of the seal 200) is reduced as a smaller portion of the reaction force generates torque. In this way, the input torque required to move the lever 206 between the first rotational position 800 and the fourth rotational position 412 is approximately the same despite the seal 200 providing increasing resistance as the door 104 approaches the closed position. In other examples, the cam surface 208 can be profiled to provide a different kinematic performance (e.g., a gradually increasing torque curve, an increased rate of closing the door 104, etc.).

Figure 9:
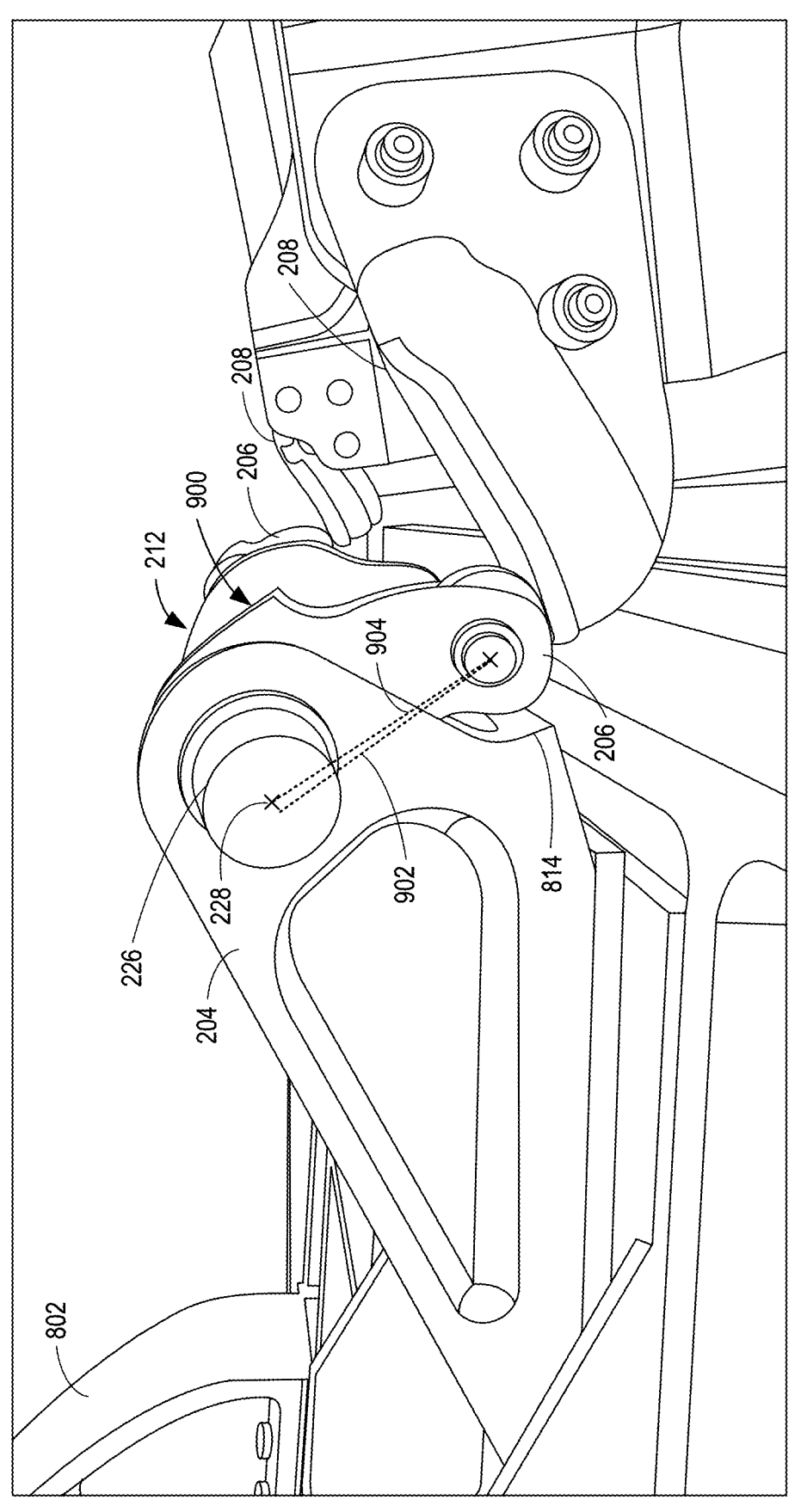
FIG. 9 illustrates the cam surface and the lever of FIG. 2B when the lever is in an over-center position.

FIG. 9 illustrates the example cam surfaces 208 and the example levers 206 of FIG. 2B when the example levers 206 are in an example over-center rotational position 900. The over-center rotational position 900 represents a position where an example over-center reaction force 902 is directed past (e.g., two degrees beyond) the axis of rotation 228 in a way that directs the lever 206 towards the fully actuated position (e.g., the fourth rotational position 812). In some examples, the over-center rotational position 900 directs the lever 206 to contact the example stop 814. In this way, the latch 102 is secured against unintended opening (e.g., loosening) based on external loads and/or vibrations. In other examples, the cam surface 208 is shaped to provide an example on-center reaction force 904 directed to the axis of rotation 228 when the fully actuated position (e.g., the fourth rotational position 812). The on-center reaction force 904 provides a static compression force to the lever 206 without any biasing and/or static torque. In other rotational positions of the lever 206 (e.g., rotational positions 800, 808, 810), the reaction force biases the lever 206 to move away from the cam surface 208.

Examples disclosed herein can be used to verify the locked or unlocked status of a door on an aircraft or other vehicle or structure. Examples disclosed herein provide visual and/or haptic verification by purely mechanical, non-electric means. Examples disclosed reduce or eliminate perturbations in the outer mold line of aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

From the foregoing, it will be appreciated that example systems, apparatus, articles of manufacture, and methods have been disclosed that latch preloaded doors while utilizing small interfaces. This advantageously allows doors, such as those on aircraft, to be secured and opened with smaller discontinuities on the skin of the aircraft. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to latch doors are disclosed herein. Further examples and combinations thereof include the following: Example 1 includes a door latch that includes a worm gear including a worm wheel and a worm screw, the worm wheel rotatable upon rotation of the worm screw; a lever operatively coupled to the worm wheel, the lever to rotate based on rotation of the worm wheel; a cam surface, the lever to contact the cam surface between a first rotational position and a second rotational position, the second rotational position different from the first rotational position; and a pin to selectively enable rotation of the worm gear.

Example 2 includes the door latch of Example 1, wherein the pin is movable between an extended position and a retracted position, in the extended position, the pin is to prevent rotation of the worm wheel.

Example 3 includes the door latch of Example 1 or 2, wherein the pin is spring loaded and biased to the extended position.

Example 4 includes the door latch of any of Examples 1-3, further including a housing adjacent the worm gear, the housing including a first aperture, the worm screw including a second aperture, the pin including a key pin and a lock pin, and the worm screw being rotatable when the lock pin is retracted into the first aperture and the key pin is in the second aperture.

Example 5 includes the door latch of any of Examples 1-4, wherein the worm gear is rotationally fixed when at least a portion of the lock pin is in the second aperture.

Example 6 includes the door latch of any of Examples 1-5, further including a flexible retaining ring to bias the pin to the extended position.

Example 7 includes the door latch of any of Examples 1-6, wherein the worm gear is a double enveloping worm gear.

Example 8 includes the door latch of any of Examples 1-7, wherein the worm screw includes an interface to receive a key to move the pin and to transfer a torque from the key to the worm screw.

Example 9 includes an aircraft that includes a door covering a chamber of the aircraft, the door rotatably coupled to the aircraft about a first axis of rotation, the door to rotate between an open position and a closed position, the door including a seal around a perimeter of the door, the seal to deform when the door is in the closed position; a latch coupled to the door in the chamber, the latch to selectively prevent rotation of the door, the latch including: a lever having a second axis of rotation different than the first axis of rotation; a worm gear including a worm wheel and a worm screw, the worm wheel rotatable in response to rotation of the worm screw, the lever rotatable in response to rotation of the worm wheel; a pin to selectively enable rotation of the worm wheel; and a cam to contact the lever to prevent the door from moving towards the open position; and a hole in a skin of the aircraft, the hole to receive a tool to move the pin and rotate the worm screw.

Example 10 includes the aircraft of Example 9, wherein the lever includes a roller rotatably coupled to an end of the lever, the roller and cam to engage during movement of the door between the open position and the closed position.

Example 11 includes the aircraft of Example 9 or 10, wherein the latch includes a torque tube coupling the worm gear and the lever, and the torque tube includes a universal joint between a first end of the torque tube and a second end of the torque tube, the first end and second end having different axes of rotation.

Example 12 includes the aircraft of any of Examples claim 9-11, wherein the latch includes a bracket rotatably coupled to the lever, the bracket including a stop to contact the lever at an end of the lever opposite the second axis of rotation about which the lever rotates.

Example 13 includes the aircraft of any of Examples claim 9-12, wherein the lever is a first lever and the cam is a first cam, and the latch includes: a second lever that is rotatable in response to the rotation of the worm wheel; and a second cam to contact the second lever to prevent the door from moving towards the open position.

Example 14 includes the aircraft of any of Examples claim 9-13, wherein the worm gear is between the first lever and the second lever.

Example 15 includes the aircraft of any of Examples claim 9-14, wherein the latch includes a housing, the worm gear in the housing, the housing including a first aperture, the worm screw including a second aperture, the pin including a key pin and a lock pin, and the worm screw being rotatable when the lock pin is retracted into the first aperture and the key pin is in the second aperture.

Example 16 includes the aircraft of any of Examples claim 9-15, wherein the worm wheel is rotationally fixed when at least a portion of the lock pin is in the second aperture, the latch further including a spring to bias the pin toward the second aperture.

Example 17 includes the aircraft of any of Examples claim 9-16, wherein the spring includes a flexible retaining ring adjacent or in the first aperture.

Example 18 includes the aircraft of any of Examples claim 9-17, wherein the second aperture is radially displaceable from the first aperture during rotation of the worm screw.

Example 19 includes a method of securing a hatch door of an aircraft, where the method includes moving the hatch door to a closed position; inserting a key into a hole in the hatch door, the hole aligned with a latch that is movable between a locked position and an unlocked position, the latch including: a housing having a first aperture, a gear rotatable in the housing, the gear including a second aperture, a locking pin movable in the first aperture and the second aperture, and a key pin movable in the second aperture, the key to move the key pin in the second aperture, which moves the lock pin from the second aperture and in the first aperture to enable rotation of the gear; rotating the key to transfer torque from the key to the gear, which moves the latch to the locked position; and removing the key when the latch is in the locked position.

Example 20 includes the method of Example 19, wherein the key includes a torque limiting feature that provides at least one of haptic or audio feedback when the latch is in the locked position, the method further including observing the at least one of haptic or audio feedback before the removing of the key.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A door latch comprising:
a worm gear including a worm wheel and a worm screw, the worm wheel rotatable upon rotation of the worm screw;
a lever operatively coupled to the worm wheel, the lever to rotate based on rotation of the worm wheel;
a cam surface, the lever to contact the cam surface between a first rotational position and a second rotational position, the second rotational position different from the first rotational position; and
a pin operable to enable rotation of the worm gear, wherein the pin is movable between an extended position and a retracted position, in the extended position, the pin is to prevent rotation of the worm wheel.

2. The door latch of claim 1, wherein the pin is spring loaded and biased to the extended position.

3. The door latch of claim 1, further including a housing adjacent the worm gear, the housing including a first aperture,
the worm screw including a second aperture,
the pin including a key pin and a lock pin, and
the worm screw being rotatable when the lock pin is retracted into the first aperture and the key pin is in the second aperture.

4. The door latch of claim 3, wherein the worm gear is rotationally fixed when at least a portion of the lock pin is in the second aperture.

5. The door latch of claim 1, further including a flexible retaining ring to bias the pin to the extended position.

6. The door latch of claim 1, wherein the worm gear is a double enveloping worm gear.

7. An aircraft comprising:
a door covering a chamber of the aircraft, the door rotatably coupled to the aircraft about a first axis of rotation, the door to rotate between an open position and a closed position, the door including a seal around a perimeter of the door, the seal to deform when the door is in the closed position;
the door latch of claim 1, the door latch coupled to the door in the chamber, the door latch operable to prevent rotation of the door, and an opening in a skin of the aircraft, the opening to receive a tool to move the pin and rotate the worm screw.

8. The aircraft of claim 7, wherein the lever includes a roller rotatably coupled to an end of the lever, the roller and the cam surface to engage during movement of the door between the open position and the closed position.

9. The aircraft of claim 7, wherein the latch includes a torque tube coupling the worm gear and the lever, and the torque tube includes a universal joint between a first end of the torque tube and a second end of the torque tube, the first end and second end having different axes of rotation.

10. The aircraft of claim 7, wherein the lever has a second axis of rotation different than the first axis of rotation, and the latch includes a bracket rotatably coupled to the lever, the bracket including a stop to contact the lever at an end of the lever opposite the second axis of rotation about which the lever rotates.

11. The aircraft of claim 7, wherein the lever is a first lever and the cam surface is a first cam surface, and the latch includes:
a second lever that is rotatable in response to the rotation of the worm wheel; and
a second cam surface to contact the second lever to prevent the door from moving towards the open position.

12. The aircraft of claim 11, wherein the worm gear is between the first lever and the second lever.

13. The aircraft of claim 7, wherein the latch includes a housing, the worm gear in the housing, the housing including a first aperture,
the worm screw including a second aperture,
the pin including a key pin and a lock pin, and
the worm screw being rotatable when the lock pin is retracted into the first aperture and the key pin is in the second aperture.

14. The aircraft of claim 13, wherein the worm wheel is rotationally fixed when at least a portion of the lock pin is in the second aperture, the latch further including a spring to bias the pin toward the second aperture.

15. The aircraft of claim 14, wherein the spring includes a flexible retaining ring adjacent or in the first aperture.

16. The aircraft of claim 13, wherein the second aperture is radially displaceable from the first aperture during rotation of the worm screw.

17. A door latch comprising:
a worm gear including a worm wheel and a worm screw, the worm wheel rotatable upon rotation of the worm screw;
a lever operatively coupled to the worm wheel, the lever to rotate based on rotation of the worm wheel;
a cam surface, the lever to contact the cam surface between a first rotational position and a second rotational position, the second rotational position different from the first rotational position; and
a pin operable to enable rotation of the worm gear, wherein the worm screw includes an interface to receive a key to move the pin and to transfer a torque from the key to the worm screw.

* * * * *